United States Patent
Urban et al.

(10) Patent No.: US 7,822,837 B1
(45) Date of Patent: Oct. 26, 2010

(54) ADAPTIVE CORRELATION OF SERVICE LEVEL AGREEMENT AND NETWORK APPLICATION PERFORMANCE

(75) Inventors: Mark Urban, Pleasanton, CA (US); Simon Adrian Jackson, Crowthorne (GB); Daniel Jose Lopez Perez, Madrid (ES); Christian Hoareau, Ruell-Malmaison (FR); Martin Briand Sjoestroem, Hellerua (DK); Rene Arvin, Stuart, FL (US)

(73) Assignee: Packeteer, Inc., Cupertino, CA (US)

( * ) Notice: Subject to any disclaimer, the term of this patent is extended or adjusted under 35 U.S.C. 154(b) by 996 days.

(21) Appl. No.: 11/027,744

(22) Filed: Dec. 30, 2004

(51) Int. Cl.
*G06F 15/173* (2006.01)

(52) U.S. Cl. ..................................... 709/223

(58) Field of Classification Search ......... 709/223–224, 709/226
See application file for complete search history.

(56) References Cited

U.S. PATENT DOCUMENTS

| | | | |
|---|---|---|---|
| 4,914,650 A | 4/1990 | Sriram | |
| 5,881,237 A * | 3/1999 | Schwaller et al. | 709/224 |
| 5,937,165 A * | 8/1999 | Schwaller et al. | 709/224 |
| 6,003,077 A | 12/1999 | Bawden et al. | |
| 6,023,456 A | 2/2000 | Chapman et al. | |
| 6,046,980 A | 4/2000 | Packer | |
| 6,219,050 B1 | 4/2001 | Schaffer | |
| 6,285,660 B1 | 9/2001 | Ronen | |
| 6,397,359 B1 | 5/2002 | Chandra et al. | |
| 6,584,467 B1 | 6/2003 | Haught et al. | |
| 6,681,232 B1 | 1/2004 | Sistanizadeh et al. | |
| 6,701,359 B1 | 3/2004 | Calabrez et al. | |
| 6,754,664 B1 * | 6/2004 | Bush | 707/102 |
| 6,798,763 B1 | 9/2004 | Kimura et al. | |
| 6,807,575 B1 * | 10/2004 | Emaru et al. | 709/224 |
| 6,928,471 B2 * | 8/2005 | Pabari et al. | 709/223 |
| 6,934,745 B2 * | 8/2005 | Krautkremer | 709/223 |
| 2002/0122427 A1 | 9/2002 | Kamentsky et al. | |
| 2002/0143901 A1 | 10/2002 | Lupo et al. | |
| 2003/0033404 A1 * | 2/2003 | Richardson | 709/224 |
| 2003/0035385 A1 | 2/2003 | Walsh et al. | |
| 2003/0112764 A1 | 6/2003 | Gaspard et al. | |
| 2004/0109410 A1 * | 6/2004 | Chase et al. | 370/229 |
| 2004/0172467 A1 * | 9/2004 | Wechter et al. | 709/224 |
| 2005/0262237 A1 * | 11/2005 | Fulton et al. | 709/224 |

* cited by examiner

*Primary Examiner*—Jeffrey Pwu
*Assistant Examiner*—Alicia Baturay
(74) *Attorney, Agent, or Firm*—Baker Botts L.L.P.

(57) ABSTRACT

Methods, apparatuses and systems directed to adaptive monitoring of network application performance. In one implementation, the present invention improves processes used by enterprises to track, manage, and troubleshoot performance of network applications across distributed networks. In one implementation, the present invention allows for a network application performance monitoring scheme that tracks end-to-end performance of selected network applications on a passive basis, while selectively engaging more invasive (synthetic) approaches to tracking performance and troubleshooting issues when needed.

11 Claims, 7 Drawing Sheets

ADAPTIVE CORRELATION OF SERVICE LEVEL AGREEMENT AND NETWORK APPLICATION PERFORMANCE

CROSS-REFERENCE TO RELATED APPLICATIONS

This application makes reference to the following commonly owned U.S. patent applications and patents, which are incorporated herein by reference in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network;"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network;"

U.S. patent application Ser. No. 09/198,051, in the name of Guy Riddle, entitled "Method for Automatically Determining a Traffic Policy in a Packet Communications Network;"

U.S. patent application Ser. No. 09/206,772, now U.S. Pat. No. 6,456,360, in the name of Robert L. Packer, Brett D. Galloway and Ted Thi, entitled "Method for Data Rate Control for Heterogeneous or Peer Internetworking;"

U.S. patent application Ser. No. 09/710,442, in the name of Todd Krautkremer and Guy Riddle, entitled "Application Service Level Mediation and Method of Using the Same;"

U.S. patent application Ser. No. 10/015,826 in the name of Guy Riddle, entitled "Dynamic Tunnel Probing in a Communications Network;"

U.S. patent application Ser. No. 10/039,992, in the name of Michael J. Quinn and Mary L. Laier, entitled "Method and Apparatus for Fast Lookup of Related Classification Entities in a Tree-Ordered Classification Hierarchy;"

U.S. patent application Ser. No. 10/108,085, in the name of Wei-Lung Lai, Jon Eric Okholm, and Michael J. Quinn, entitled "Output Scheduling Data Structure Facilitating Hierarchical Network Resource Allocation Scheme;"

U.S. patent application Ser. No. 10/178,617, in the name of Robert E. Purvy, entitled "Methods, Apparatuses and Systems Facilitating Analysis of Network Device Performance;"

U.S. patent application Ser. No. 10/155,936 now U.S. Pat. No. 6,591,299, in the name of Guy Riddle, Robert L. Packer, and Mark Hill, entitled "Method For Automatically Classifying Traffic With Enhanced Hierarchy In A Packet Communications Network;"

U.S. patent application Ser. No. 10/236,149, in the name of Brett Galloway and George Powers, entitled "Classification Data Structure enabling Multi-Dimensional Network Traffic Classification and Control Schemes;"

U.S. patent application Ser. No. 10/334,467, in the name of Mark Hill, entitled "Methods, Apparatuses and Systems Facilitating Analysis of the Performance of Network Traffic Classification Configurations;"

U.S. patent application Ser. No. 10/453,345, in the name of Scott Hankins, Michael R. Morford, and Michael J. Quinn, entitled "Flow-Based Packet Capture;"

U.S. patent application Ser. No. 10/676,383 in the name of Guy Riddle, entitled "Enhanced Flow Data Records Including Traffic Type Data;"

U.S. patent application Ser. No. 10/720,329, in the name of Weng-Chin Yung, Mark Hill and Anne Cesa Klein, entitled "Heuristic Behavior Pattern Matching of Data Flows in Enhanced Network Traffic Classification;"

U.S. patent application Ser. No. 10/812,198 in the name of Michael Robert Morford and Robert E. Purvy, entitled "Adaptive, Application-Aware Selection of Differentiated Network Services;"

U.S. patent application Ser. No. 10/843,185 in the name of Guy Riddle, Curtis Vance Bradford and Maddie Cheng, entitled "Packet Load Shedding;" and U.S. patent application Ser. No. 10/938,435 in the name of Guy Riddle, entitled "Classification and Management of Network Traffic Based on Attributes Orthogonal to Explicit Packet Attributes."

FIELD OF THE INVENTION

The present invention relates to computer networks and, more particularly, to methods, apparatuses and systems directed to tracking, managing and/or troubleshooting the performance of network application, or business processes, across computer networks.

BACKGROUND OF THE INVENTION

Critical operational processes of businesses, governments, and institutions often rely on software applications that execute on distributed systems that communicate over networks (such as, Wide Area Networks (WANs) or Internet links). Proper performance of these applications is critical to continued operation of an enterprise's business processes and the productivity of employees. Disruptions to the network applications and business processes can be very costly, leading to lost employee productivity, lost revenue opportunities, and/or increased costs.

End-to-end performance—that is, the performance or response time measured between two hosts implementing a network application over a network—most closely represents the performance of a business process. Ideally, the performance of the network communication path between the two ends of a network application should be seamless. Accordingly, a variety of technologies have been deployed to manage and track the performance of computer networks and networked applications. Some network performance monitoring solutions rely on passive techniques (e.g., recording packet traces and arrival times), while others rely on active methods that inject synthetic traffic into the network. For example, SLA managers track the performance of the Wide Area Network connection provided by a network service provider. However, these solutions only track a segment of the communications path between end systems and therefore only yield information relating to part of the potential performance issues. In addition, desktop application agents, deployed on individual computers, either generate artificial traffic meant to simulate actual operation of applications, or monitor actual traffic generated by a given network application to track response times. While desktop application agents can track end-to-end performance, they possess certain drawbacks. For instance, desktop application agents involve large deployment overhead as they must be individually installed on each desktop. In addition, the desktop application agents are typically limited to monitoring the end-to-end performance of only one network application, and may not provide additional information relating to the cause of any degradation in performance.

Other network application performance monitoring solutions exist. For example, co-pending and commonly owned U.S. patent application Ser. Nos. 09/710,442 and 10/812,198 disclose technologies that calculate the time traffic spends traveling between a client and a server and the time used by the server itself based on passive monitoring of packet arrival times at a network device deployed on a WAN link. Moreover, some network monitoring devices, such as the Packet-Shaper® network application traffic management device offered by Packeteer, Inc. of Cupertino, Calif., include synthetic transaction agents that inject synthetic traffic into the network to monitor network performance. Synthetic transaction agents are often deployed on carrier network equipment to track point-to-point service level agreements corresponding to a WAN circuit. Synthetic transactions, however, increase network load, often in communications paths or links that already are at full capacity. In addition, beyond increasing network load, the synthetic traffic does not represent actual network traffic corresponding to the actual network applications and processes of direct interest to enterprises. Still further, synthetic transactions are initiated by an intermediate network device in the communications path between end systems, and therefore do not track end-to-end performance. While useful for second level diagnostics and for tracking carrier performance to service level agreements, the use of synthetic transactions does not satisfy the primary interest of the business, to monitor and maintain productivity of end-to-end business processes.

While the network application performance monitoring technologies achieve their respective objectives, a need in the art exists for network performance monitoring technologies that adapt to current network conditions. A need in the art also exists for network monitoring systems that can be configured that efficiently use network resources or reduce network load. Embodiments of the present invention substantially fulfill these needs.

SUMMARY OF THE INVENTION

The present invention provides methods, apparatuses and systems directed to adaptive monitoring of network application performance. In one implementation, the present invention improves processes used by enterprises to track, manage, and troubleshoot performance of network applications across distributed networks. In one implementation, the present invention allows for a network application performance monitoring scheme that tracks end-to-end performance of selected network applications on a passive basis, while selectively engaging more invasive (synthetic) approaches to tracking performance and troubleshooting issues when needed. In one implementation, the present invention proactively tracks actual end-to-end performance for business applications and allows network administrators to rapidly troubleshoot disruptions to performance, while minimizing amount of network traffic put on the network to track and troubleshoot performance issues. The present invention can be used to manage and track end-to-end performance of critical network applications, troubleshoot performance issues, and to track network performance against contractual service level agreement requirements.

DESCRIPTION OF PREFERRED EMBODIMENT(S)

Figure 1:
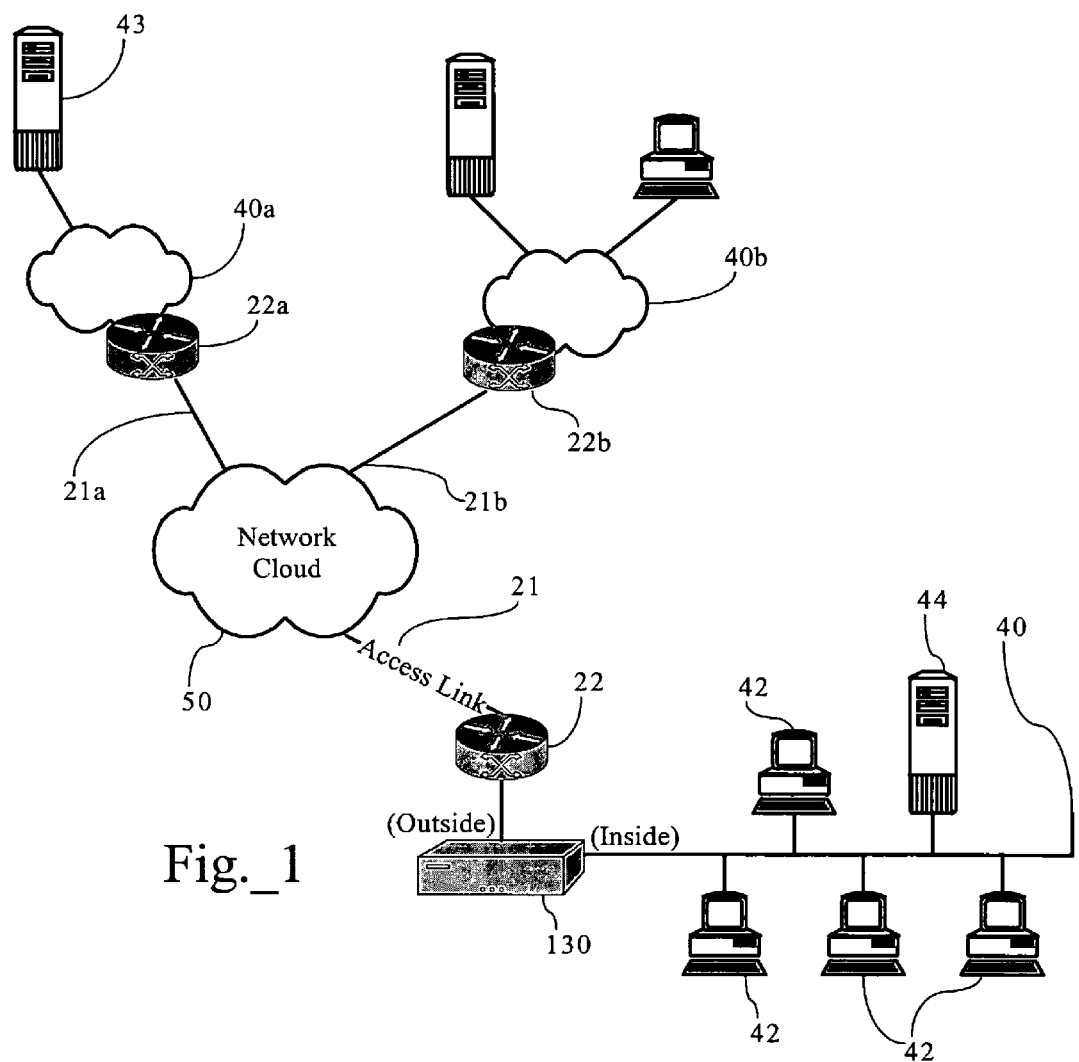
FIG. 1 is a functional block diagram illustrating a computer network system architecture in which an embodiment of the present invention may operate.
Figure 2:
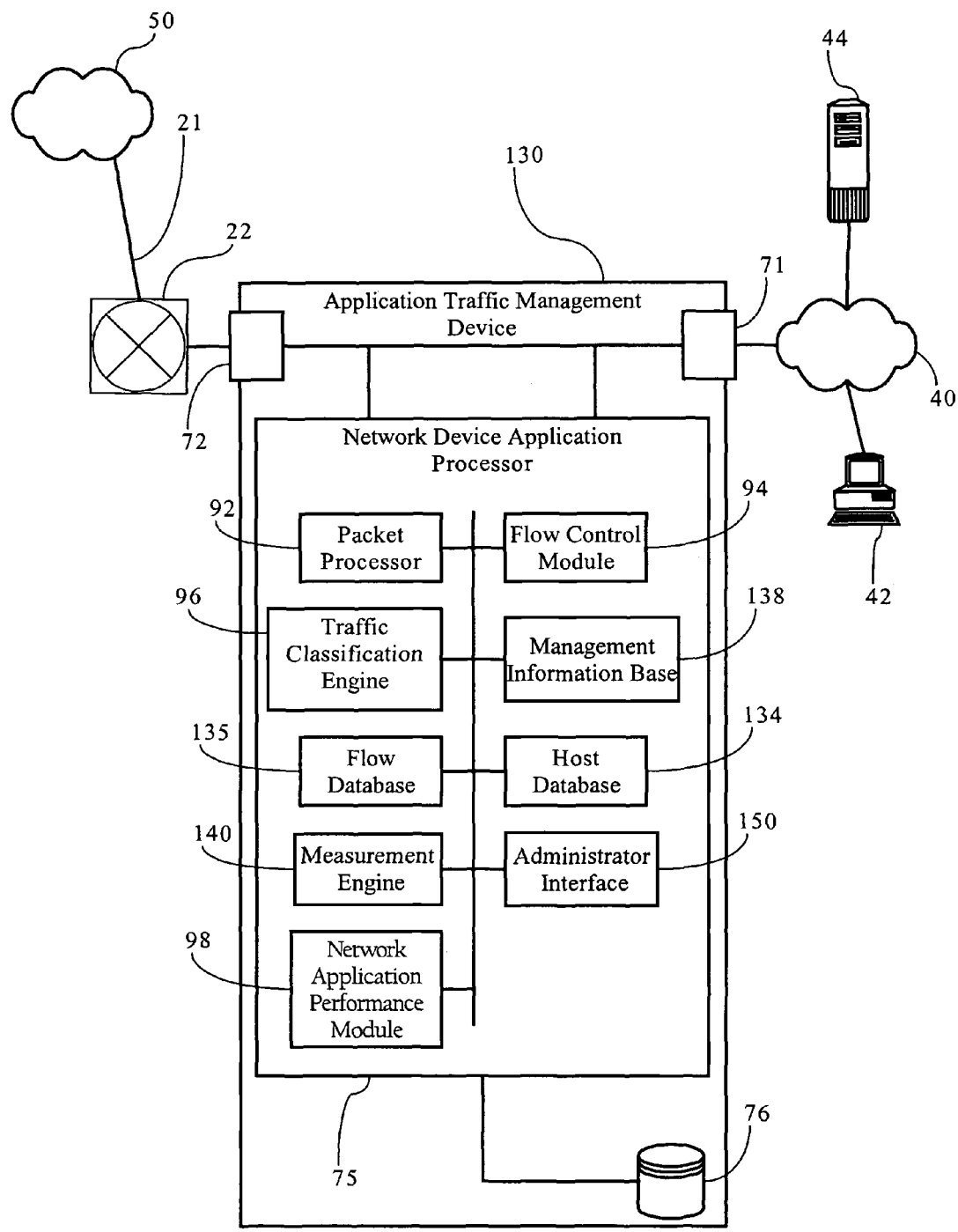
FIG. 2 is a functional block diagram illustrating the functionality of a network device, according to one implementation of the present invention, for use in a coordinated traffic classification environment.
Figure 3:
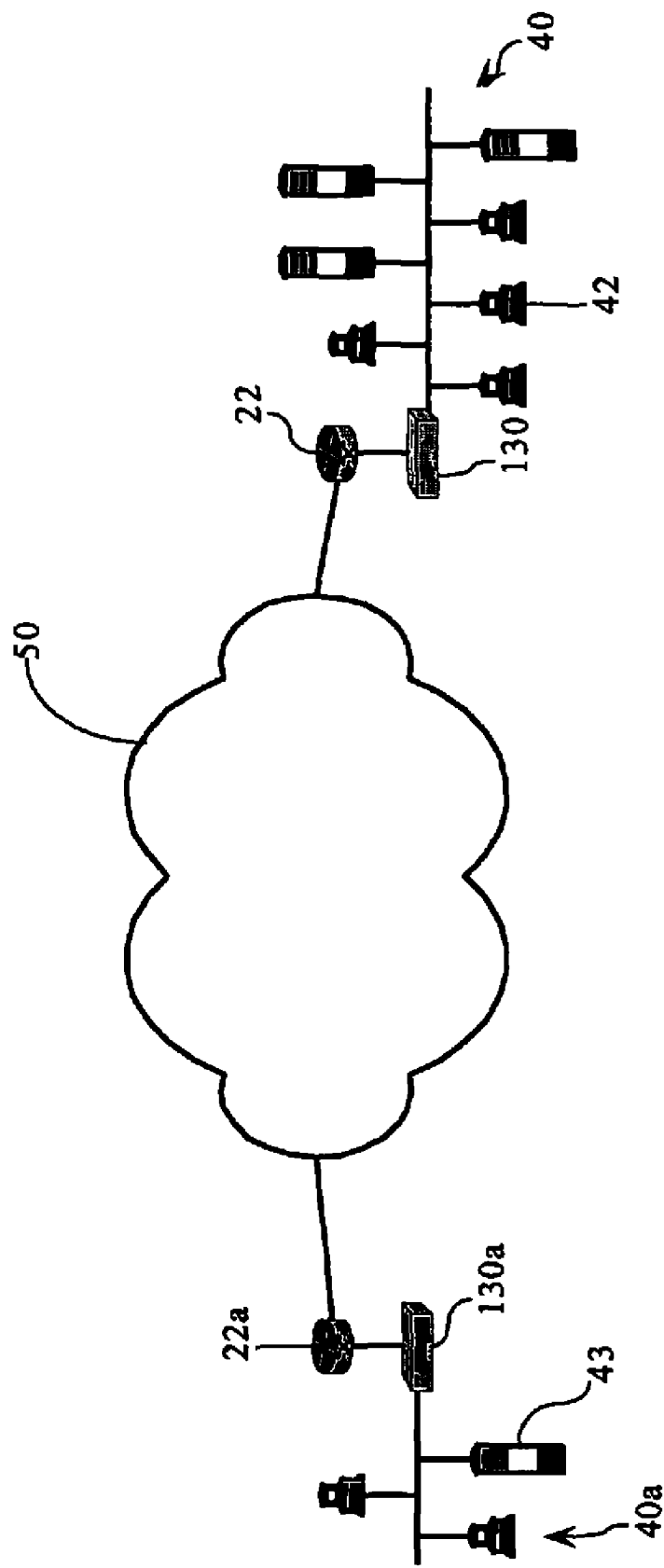
FIG. 3 is a functional block diagram showing a wide area network interconnecting two enterprise networks.

FIGS. 1, 2 and 3 illustrate exemplary network environments in which embodiments of the present invention operates. Of course, the present invention can be applied to a variety of network architectures. FIG. 1 illustrates, for didactic purposes, a network 50, such as wide area network, interconnecting a first enterprise network 40, supporting a central operating or headquarters facility, and a second enterprise network 40a, supporting a branch office facility. Network 50 may also be operably connected to other networks, such as network 40b, associated with the same administrative domain as networks 40, 40a, or a different administrative domain. As FIGS. 1 and 2 show, the first network 40 interconnects several TCP/IP end systems, including client devices 42 and server device 44, and provides access to resources operably connected to computer network 50 via router 22 and access link 21. Access link 21 is a physical and/or logical connection between two networks, such as computer network 50 and network 40. The computer network environment, including network 40 and network 50 is a packet-based communications environment, employing TCP/IP protocols, and/or other suitable protocols, and has a plurality of interconnected digital packet transmission stations or routing nodes. First network 40, and networks 40a a 40b, can each be a local area network, a wide area network, or any other suitable network.

As FIGS. 1 and 2 illustrate, application traffic management device 130, in one implementation, is deployed at the edge of network 40. As discussed more fully below, application traffic management device 130 includes functionality operative to monitor the performance of the network and/or network applications. In one implementation, application traffic management device 130 is also operative to classify and manage data flows traversing access link 21. However, the network performance monitoring functionality according to the present invention can be integrated into a variety of network devices, such as proxies, firewalls, packet capture devices or other network monitoring equipment, VPN servers, web services network gateways or brokers, and the like. In other implementations, as FIG. 3 illustrates, the network performance monitoring functionality can be implemented to operate in connection with first and second application traffic management devices 130, 130 deployed at opposite sides of a WAN or other network.

As FIG. 2 illustrates, network application traffic management device 130, in one implementation, comprises network device application processor 75, and first and second network interfaces 71, 72, which operably connect application traffic management device 130 to the communications path between router 22 and network 40. Network device application processor 75 generally refers to the functionality implemented by application traffic management device 130, such as network monitoring or reporting, application traffic management, and the like. In one embodiment, network device application processor 75 is a combination of hardware and software, such as a central processing unit, memory, a system bus, an operating system, device drivers, and one or more software modules implementing the functions performed by application traffic management device 130, as well as the coordinated traffic classification functionality described herein. For didactic purposes, application traffic management device 130 is configured to manage network traffic traversing access link 21. The above-identified patents and patent applications, incorporated by reference herein, disclose various functionalities and features that may be incorporated into application traffic management devices according to various implementations of the present invention.

In one embodiment, first and second network interfaces 71, 72 are the hardware communications interfaces that receive and transmit packets over the computer network environment. In one implementation, first and second network interfaces 71, 72 reside on separate network interface cards operably connected to the system bus of application traffic management device 130. In another implementation, first and second network interfaces reside on the same network interface card. In addition, the first and second network interfaces 71, 72 can be wired network interfaces, such as Ethernet (IEEE 802.3) interfaces, and/or wireless network interfaces, such as IEEE 802.11, BlueTooth, satellite-based interfaces, and the like. As FIG. 2 illustrates, application traffic management device 130, in one embodiment, includes persistent memory 76, such as a hard disk drive or other suitable memory device, such writable CD, DVD, or tape drives. In other implementations, application traffic management device 130 can include additional network interfaces, beyond network interfaces 71 and 72, to support additional access links or other functionality. Furthermore, U.S. application Ser. No. 10/843,185 provides a description of the operation of various modules (according to one possible implementation of the present invention), such as network interface drivers, and data structures for receiving into memory and processing packets encountered at network interfaces 71, 72.

As FIG. 2 illustrates, network device application processor 75, in one implementation, includes a packet processor 92, flow control module 94, traffic classification engine 96, and network application performance module 98. Network device application processor 75, in one implementation, further comprises host database 134, flow database 135, measurement engine 140, management information base 138, and administrator interface 150. In one embodiment, the packet processor 92 is operative to process data packets, such as detecting new data flows, parsing the data packets for various attributes (such as source and destination addresses, and the like) and storing packet attributes in a buffer structure, and maintaining one or more flow variables or statistics (such as packet count) in connection with the data flows and/or the source/destination hosts. The traffic classification engine 96, as discussed more fully below, is operative to classify data flows based on one or more attributes associated with the data flows. Traffic classification engine 96, in one implementation, stores traffic classes associated with data flows encountered during operation of application traffic management device 130, as well as manually created traffic classes configured by a network administrator, in a hierarchical traffic class structure. In one embodiment, traffic classification engine 96 stores traffic classes, in association with pointers to network performance monitoring policies or pointers to data structures defining such network performance monitoring policies. In one implementation, flow control module 94 is operative to apply bandwidth utilization controls to data flows traversing the access link 21 in the inbound and/or outbound directions. Network application performance module 98, as discussed more fully below, adaptively monitors the performance of one or more selected network applications or traffic classes.

As discussed above, in one implementation, network device application processor 75 further comprises measurement engine 140, management information base (MIB) 138, and administrator interface 150. Management information base 138 is a database of standard and extended network objects related to the operation of application traffic management device 130. Measurement engine 140 maintains measurement and statistical data relating to operation of application traffic management device 130 to allow for monitoring of bandwidth utilization and network performance across access link 21 with respect to a plurality of bandwidth utilization and other network statistics on an aggregate and/or per-traffic-class level.

Administrator interface 150 facilitates the configuration of application traffic management device 130 to adjust or change operational and configuration parameters associated with the device. For example, administrator interface 150 allows administrators to select identified traffic classes and associate them with traffic management policies. Administrator interface 150 also displays various views associated with a hierarchical traffic classification scheme and allows administrators to configure or revise the hierarchical traffic classification scheme. Administrator interface 150 can provide a command line interface and/or a graphical user interface accessible, for example, through a conventional browser on client device 42.

A.1. Packet Processing

As discussed above, packet processor 92, in one implementation, is operative to detect new data flows, instantiate data structures associated with the flows and parse packets to identify packet attributes, such as source and destination addresses, port numbers, etc., and populate one or more fields in the data structures. The U.S. Patents and patent applications identified above discuss the operation of packet processors that can be incorporated into embodiments of the present invention. In one embodiment, when packet processor 92 encounters a new data flow it stores the source and destination IP addresses contained in the packet headers in host database 134. Packet processor 92 further constructs a control block (flow) object in flow database 135 including attributes characterizing a specific flow between two end systems, such as source and destination port numbers, etc. Other flow attributes in the flow object may include application specific attributes gleaned from layers above the TCP layer, such as codec identifiers for Voice over IP calls, Citrix database identifiers, and the like. Packet processor 92 also stores meta information relating to the received packets in a packet buffer—a memory space, typically in dynamic random access memory (DRAM), reserved for packets traversing application traffic management device 130. In one embodiment, the packets are stored in the packet buffer with a wrapper including various information fields, such as the time the packet was received, the packet flow direction (inbound or outbound), and a pointer to the flow object corresponding to the flow of which the packet is a part.

In typical network deployments, the majority of data flows are generally TCP or UDP flows. However, any suitable transport layer flow can be recognized and detected. As discussed more fully below, in one embodiment, flows are identified based on the following flow attributes: 1) source IP address, 2) destination IP address, 3) source port number, 4) destination port number, and 5) protocol (derived from the "protocol" field in IPv4 headers, and the "NextHeader" field in IPv6 headers). One skilled in the art will recognize that flows can be identified in relation to a variety of attributes and combinations of attributes. In addition, methods for determining new data flows and assigning packets to existing data flows are well known in the art and also depend on the particular transport layer protocol employed. For a TCP flow, for example; packet processor 92 can determine a new data flow by detecting SYN, SYN/ACK, and/or ACK packets. However, a new data flow, depending on the network protocol associated with the flow, can simply be a data flow for which there is no corresponding flow object. For example, with UDP and GRE flows (where there is no explicit connection or handshake mechanism, such as SYN packets), a new flow is recognized by associating the source and destination addresses and port numbers to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the last packet and the time of the current packet is greater than the threshold, the current packet is deemed part of a new flow. In another implementation, a background and/or separate process can periodically compare the last packet times associated with a flow to a threshold period of time and deem the flow terminated if the last packet time is beyond the threshold period of time. The termination of TCP connections is typically detected by identifying FIN packets; however, the timeout mechanisms discussed above can be used in situations where a FIN packet is not detected.

In one embodiment, a control block (flow) object contains a flow specification object including such attributes as pointers to the "inside" and "outside" IP addresses in host database 134, as well as other flow specification parameters, such as inside and outside port numbers, service type (see below), protocol type and other parameters characterizing the data flow. In one embodiment, such parameters can include information gleaned from examination of data within layers 2 through 7 of the OSI reference model. U.S. Pat. No. 6,046,980 and U.S. Pat. No. 6,591,299, as well as others incorporated by reference herein, disclose classification of data flows for use in a packet-based communications environment. FIGS. 1 and 2 illustrate the concept associated with inside and outside addresses, where network interface 71 is the "inside" network interface and network interface 72 is the "outside" network interface. As discussed above, in one embodiment, a flow specification object includes an "inside" and "outside" address relative to application traffic management device 130. See FIG. 1. For a TCP/IP packet, packet processor 92 can compute the inside and outside addresses based on the source and destination network addresses of the packet and the direction of the packet flow. Still further, packet processor 92 can also identify which host is the client and which host is the server for a given data flow and store this information in the flow specification or control block object. The identification of a server or client in a given transaction generally depends on the network protocols employed by the hosts. For example, in TCP flows, a client initiates a transaction by transmitting a SYN packet to initiate a TCP connection. Application traffic management device 130 can detect the SYN packet and note the source network address of the packet as the client host, and the destination address as the server host. One of ordinary skill in the art will recognize how to identify clients and servers in connection with other networking protocols.

In one embodiment, packet processor 92 creates and stores control block objects corresponding to data flows in flow database 135. In one embodiment, control block object attributes include a pointer to a corresponding flow specification object, as well as other flow state parameters, such as TCP connection status, timing of last packets in the inbound and outbound directions, speed information, apparent round trip time, packet count, etc. Control block object attributes further include at least one traffic class identifier (or pointer(s) thereto) associated with the data flow, as well as policy parameters (or pointers thereto) corresponding to the identified traffic class. In one embodiment, control block objects further include a list of traffic classes for which measurement data (maintained by measurement engine 140) associated with the data flow should be logged. In one embodiment, to facilitate association of an existing control block object to subsequent packets associated with a data flow or connection, flow database 135 further maintains a control block hash table including a key comprising a hashed value computed from a string comprising the inside IP address, outside IP address, inside port number, outside port number, and protocol type (e.g., TCP, UDP, etc.) associated with a pointer to the corresponding control block object. According to this embodiment, to identify whether a control block object exists for a given data flow, packet processor 92 hashes the values identified above and scans the hash table for a matching entry. If one exists, packet processor 92 associates the pointer to the corresponding control block object with the packets in the data flow.

A.2. Traffic Classification Engine

As discussed above, traffic classification engine 96 is operative to classify data flows into one of a plurality of traffic classes. Traffic classification engine 96, in one implementation, comprises a plurality of service type identification modules, each of which correspond to a set of service types. Each service type identification module analyzes one or more packets in a given data flow to attempt to identify a service type corresponding to the flow. A service type, in one implementation, can be a network protocol, a service, or a network-application. For example, one service type identification module can correspond to a network application, such as Citrix®, while another service type identification module can be dedicated to detecting Oracle® or PostgreSQL database traffic. Still other service type identification modules can classify HTTP flows, FTP flows, ICMP flows, RTP flows, NNTP, SMTP, SSL, DICOM and the like. In one implementation, traffic classification engine 96 passes pointers to received packets to each service type identification module, which then inspect the packets stored in the buffer memory. In one implementation, each service type identification module has an associated packet count threshold (in the aggregate, packets from server to client, or client to server) after which it no longer attempts to classify a data flow. In one implementation, the packet count threshold will vary across the service type identification modules. For example, a service type identification module dedicated to classifying Citrix® traffic may be able to classify a data flow with certainty after three packets. In many instances, application traffic management device 130 may have to encounter more than one packet corresponding to a data flow in order to finally classify the data flow. For example, the initial TCP handshake packets may only reveal IP address, port numbers and protocol identifiers. While this information may be sufficient to identify HTTP traffic, for example, additional packets (such as data packets) may reveal a more specific network application, such as an accounting application or peer-to-peer file sharing application, that utilizes HTTP. Accordingly, in one implementation, each service type identification module responds to receiving a pointer to a packet by 1) reporting a matching service type identifier and the desire to inspect more packets in the flow (to possibly identify a more specific service type identifier); 2) reporting a matching service type and no interest in inspecting subsequent packets in the flow; 3) reporting no matching service type identifier and the desire to inspect more packets in the flow; and 4) reporting no matching service type and no interest in inspecting subsequent packets in the flow.

To allow for identification of service types (e.g., FTP, HTTP, etc.), traffic classification engine 96, in one embodiment, is supported by one to a plurality of service identification tables in a relational database that allow for identification of a particular service type (e.g., application, protocol, etc.) based on the attributes of a particular data flow. Of course, other suitable data structures can be used to support the identification of service types, such as a set of hard-coded instructions, an XML file, and the like. In one embodiment, a services table including the following fields: 1) service ID, 2) service aggregate (if any), 3) name of service, 4) service attributes (e.g., port number, outside IP address, etc.), and a 5) default bandwidth management policy. A service aggregate encompasses a combination of individual services (each including different matching criteria, such as different port numbers, etc.) corresponding to the service aggregate. When application traffic management device 130 encounters a new flow, the service type identification modules of traffic classification engine 96 analyze the data flow against the service attributes in their respective services tables to identify a service ID corresponding to the flow. In one embodiment, traffic classification engine 96 may identify more than one service ID associated with the flow. In this instance, traffic classification engine 96 associates the more/most specific service ID to the flow. For example, network traffic associated with a peer-to-peer file sharing service may be identified according to a network protocol, such as TCP or HTTP traffic, as well as higher level, application-specific traffic types such as the actual file sharing application itself (e.g., Napster, Morpheus, etc.). In this instance, traffic classification engine 96 associates the flow with the most specific service ID. As a further example, an RTSP application data flow can be further classified to RTSP-Broadcast or RTSP-REALNET-TCP in the middle of the flow after a particular signature in the packets is encountered. In one implementation, traffic classification engine 96 writes the identified service type ID into the control block (flow) object corresponding to the data flow.

As discussed more fully below, service type identification, in one implementation, is a preliminary operation to the classification of a data flow according to the hierarchical traffic classification scheme configured by a network administrator. For example, a traffic class maintained by traffic classification engine 96 may be configured to include matching rules based on the service IDs in the services table. For example, a matching rule directed to HTTP traffic may simply refer to the corresponding service ID, as opposed to the individual attributes that the service type identification modules uses to initially identify the service. This implementation allows for a variety of hierarchical traffic classification configurations, such as the configuration of child traffic classes that further classify HTTP traffic on the basis of a network application, a range of IP addresses, and the like.

Still further, the service type identifiers can correspond to a specific network application (e.g., Napster, Citrix, NetIQ, Oracle, Skype, etc.) and more generally to network protocols or services, such as IP, TCP, HTTP, SOAP, XML, UDP, FTP, SMTP, FTP, UDP, etc. As discussed more fully below, in one implementation, traffic classification engine 96 triggers operation of host probing module 97 for a given data flow, if a service type identifier corresponding to a network application (as opposed to a protocol or service) is not identified within a threshold number of packets.

A traffic class comprises a set of matching rules or attributes allowing for logical grouping of data flows that share the same characteristic or set of characteristics. In one implementation, the matching rules can correspond to the service type identifiers discussed above, as well as other data flow attributes, such as the network interface on which the packets are received by application traffic management device, whether the server is the inside or outside host (see above), non-standard and standard port numbers, host IP address or subnet, MAC address, application-specific strings, diffsery codes, MPLS tags, VLAN tags, and the like. In one embodiment, each traffic class has at least one attribute defining the criterion(ia) used for identifying a specific traffic class. In one implementation, the attributes defining a given traffic class can be based on explicitly presented attributes of one or more packets corresponding to a data flow (as discussed above), or be based on behavioral attributes of the end systems associated with the flow. The U.S. patent applications identified above disclose various network traffic classification mechanisms that can be incorporated into embodiments of the present invention. For example, a traffic class can be defined by configuring an attribute defining a particular IP address or subnet. Of course, a particular traffic class can be defined in relation to a plurality of related and/or orthogonal data flow attributes. U.S. Pat. Nos. 6,412,000 and 6,591,299, and U.S. patent application Ser. No. 10/039,992 describe some of the data flow attributes that may be used to define a traffic class, as well as the use of hierarchical classification structures to associate traffic classes to data flows. In one embodiment, application traffic management device 130 includes functionality allowing for classification of network traffic based on information from layers 2 to 7 of the OSI reference model. Application traffic management device 130 can be configured to include matching rules that define a plurality of network applications commonly found in enterprise networks, such as database applications, Citrix® flows, ERP applications, and the like. As discussed below, the matching rules or attributes for a traffic class may be based on various types of node behavior, such as the number of concurrent connections of the inside or Outside host.

In one embodiment, application traffic management device 130 is configured to include a predefined set of traffic classes based upon a knowledge base gleaned from observation of common or known traffic types on current networks. Application traffic management device 130, in one embodiment, also allows an administrator to manually create a traffic class by specifying a set of matching attributes. As discussed above, administrator interface 150, in one embodiment, allows for selection of a traffic class and the configuration of traffic management policies for the selected traffic class. Administrator interface 150, in one embodiment, also allows for the selection and arrangement of traffic classes into hierarchical reference trees. In one embodiment, traffic classification engine 96 also stores traffic classes added by the traffic discovery module. Furthermore, as discussed below, application traffic management device 130 may also include traffic class discovery functionality that automatically adds traffic classes to traffic classification engine 96 in response to data flows traversing the device. Automatic network traffic discovery and classification (see below) is disclosed in U.S. Pat. Nos. 6,412,000, 6,457,051, and 6,591,299, which are incorporated herein by reference.

Traffic classification engine 96, in one implementation, stores traffic classes associated with data flows that traverse access link 21. Traffic classification engine 96, in one embodiment, stores the traffic classes and corresponding data (e.g., matching rules, policies, partition pointers, etc.) related to each traffic class in a hierarchical tree. This tree is organized to show parent-child relationships—that is, a particular traffic class may have one or more subordinate child traffic classes with more specific characteristics (matching rules) than the parent class. For example, at one level a traffic class may be configured to define a particular user group or subnet, while additional child traffic classes can be configured to identify specific application traffic associated with the user group or subnet. U.S. application Ser. No. 10/334,467, as well as other patents and patent applications identified above, disclose how traffic classification engine 96 traverses the hierarchical tree to match a data flow to a leaf traffic class node.

In one embodiment, the root traffic classifications are "/Inbound" and "/Outbound" data flows. Any data flow not explicitly classified is classified as "/Inbound/Default" or "/Outbound/Default". The "LocalHost" traffic class corresponds to packets and data flows destined for application traffic management device 130, such as requests for stored measurement data, traffic class mapping packets, or device configuration changes. In one embodiment, traffic classification engine 96 attempts to match to a leaf traffic class node before proceeding to remaining traffic class nodes in the hierarchical configuration. If a traffic class is found, the traffic classification engine 96 stops the instant search process and returns the identified traffic classification. Of course, one skilled in the art will recognize that alternative ways for traversing the hierarchical traffic class configuration can be implemented. For example, traffic classification engine 96 may be configured to traverse all traffic class nodes at a given level before proceeding to lower levels of the traffic classification tree.

In one embodiment, administrator interface 150 displays the traffic class tree and allows for selection of a traffic class and the configuration of network monitoring policy for that traffic class. Administrator interface 150 also allows for the arrangement of traffic classes into a hierarchical classification tree. Application traffic management device 130 further allows an administrator to manually create a traffic class by specifying a set of matching rules and also automatically creates traffic classes by monitoring network traffic across access link 21 and classifying data flows according to a set of criteria to create matching rules for each traffic type. In one embodiment, each traffic class node includes a traffic class identifier; at least one traffic class (matching) attribute; at least one policy parameter (e.g., a bandwidth utilization control parameter, a network performance monitoring policy parameter, etc.), a pointer field reserved for pointers to one to a plurality of child traffic classes. In one embodiment, traffic classification engine 96 implements a reference tree classification model wherein separate traffic classification trees can be embedded in traffic class nodes of a given traffic classification tree. U.S. application Ser. No. 10/236,149, incorporated by reference herein, discloses the use and implementation of embeddable reference trees.

A.3. Flow Control Module

As discussed above, flow control module 94 applies bandwidth utilization controls (and, in some embodiments, other policies) to data flows traversing access link 21. The above-identified patents and patent applications describe the operation of, and bandwidth utilization controls, implemented or supported by flow control module 94. Application traffic management device 130, however, can also be configured to implement a variety of different policy types, such as security policies, admission control policies, marking (diffserv, VLAN, etc.) policies, redirection policies, caching policies, transcoding policies, and network address translation (NAT) policies. Of course, one of ordinary skill in the art will recognize that other policy types can be incorporated into embodiments of the present invention. The functionality of flow control module 94, in one implementation, can be conceptually segregated into three main tasks: 1) allocation of bandwidth to individual flows, 2) enforcement of bandwidth allocations, and 3) monitoring of actual bandwidth utilization to provide feedback to subsequent bandwidth allocations.

Allocation of bandwidth is primarily influenced by three main factors: 1) the number of concurrent flows and their respective traffic classifications; 2) the overall or aggregate bandwidth utilization control scheme configured by the network administrator (such as the capacity of the access link, the partitions that have been configured, configured rate policies, and the like), and 3) the respective target rates corresponding to the individual flows. U.S. application Ser. No. 10/810,785 and U.S. Pat. Nos. 5,802,106 and 6,205,120, incorporated by reference above, disclose methods for determining target rates for data flows for use in bandwidth allocation decisions. As discussed above, a user can select a given traffic class and specify one or more bandwidth utilization controls for the traffic class. A bandwidth utilization control for a particular traffic class can comprise an aggregate bandwidth utilization control, a per-flow bandwidth utilization control, or a combination of the two (see Sections A.3.a. & A.3.b.). The combination of bandwidth utilization controls across the traffic classes defines an aggregate bandwidth utilization control scheme.

Flow control module 132 can use any suitable functionality to enforce bandwidth allocations known in the art, including, but not limited to class-based queuing, weighted fair queuing, class-based weighted fair queuing, Committed Access Rate (CAR) and "leaky bucket" techniques. Flow control module 132, in one implementation, may incorporate any or a subset of the TCP rate control functionality described in the cross-referenced U.S. patents and/or patent applications set forth above for controlling the rate of data flows.

A.3.a. Aggregate Bandwidth Utilization Control

An aggregate bandwidth utilization control operates to manage bandwidth for aggregate data flows associated with a traffic class. An aggregate bandwidth utilization control can be configured to essentially partition the available bandwidth corresponding to a given access link. For example, a partition can be configured to protect a network traffic class by guaranteeing a defined amount of bandwidth and/or limit a network traffic class by placing a cap on the amount of bandwidth a traffic class can consume. Such partitions can be fixed or "burstable." A fixed partition allows a traffic class to use in the aggregate a defined amount of bandwidth. A fixed partition not only ensures that a specific amount of bandwidth will be available, but it also limits data flows associated with that traffic class to that same level. A burstable partition allows an aggregate traffic class to use a defined amount of bandwidth, and also allows that traffic class to access additional unused bandwidth, if needed. A cap may be placed on a burstable partition, allowing the traffic class to access up to a maximum amount of bandwidth, or the burstable partition may be allowed to potentially consume all available bandwidth across the access link. Partitions can be arranged in a hierarchy—that is, partitions can contain partitions. For example, the bandwidth, or a portion of the bandwidth, available under a parent partition can be allocated among multiple child partitions. In one embodiment, at the highest level, a partition exists for all available outbound bandwidth, while another partition exists for all available inbound bandwidth across the particular access link. These partitions are then sub-dividable to form a hierarchical tree. For example, an enterprise employing static partitions may define a static partition for a PeopleSoft software application traffic class, and sub-divide this parent partition into a large burstable child partition for its human resources department and a smaller burstable child partition for the accounting department. U.S. patent application Ser. No. 10/108,085 includes a discussion of methods for implementing partitions, as well as novel solutions for implementing partitions arranged in a hierarchical allocation scheme.

In one embodiment, a partition is created by selecting a traffic class and configuring a partition for it. As discussed above, configurable partition parameters include 1) minimum partition size (in bits per second); 2) whether it is burstable (that is, when this option is selected, it allows the partition to use available excess bandwidth; when the option is not selected the partition has a fixed size); and 3) maximum bandwidth to be used when the partition bursts. For example, a network administrator may configure a partition for data flows associated with suspicious users to limit the effect of the network traffic associated with them on utilization of access link 21.

A.3.b. Per-Flow Bandwidth Utilization Controls

Flow control module 132 is also operative to enforce per-flow bandwidth utilization controls on traffic across access link 21. Whereas aggregate bandwidth utilization controls (e.g., partitions, above) allow for control of aggregate data flows associated with a traffic class, per-flow bandwidth utilization controls allow for control of individual data flows. In one embodiment, flow control module 132 supports different bandwidth utilization control types, including, but not limited to, priority policies, rate policies, and discard policies. A priority policy determines how individual data flows associated with a traffic class are treated relative to data flows associated with other traffic classes. A rate policy controls the rate of data flows, for example, to smooth bursty traffic, such as HTTP traffic, in order to prevent a TCP end system from sending data packets at rates higher than access link 21 allows, thereby reducing queuing in router buffers and improving overall efficiency. U.S. patent application Ser. No. 08/742,994, now U.S. Pat. No. 6,038,216, incorporated by reference above, discloses methods and systems allowing for explicit data rate control in a packet-based network environment to improve the efficiency of data transfers. Similarly, U.S. Pat. No. 6,018,516, incorporated by reference above, methods and systems directed to minimizing unneeded retransmission of packets in a packet-based network environment. A rate policy can be configured to establish a minimum rate for each flow, allow for prioritized access to excess available bandwidth, and/or set limits on total bandwidth that the flow can consume. A discard policy causes flow control module 132 to discard or drop data packets or flows associated with a particular traffic class. Other policy types include redirection policies where an inbound request designating a particular resource, for example, is redirected to another server.

A.4. Adaptive Network Application Performance Monitoring

As discussed above, network application performance module 98 is operative to monitor the packet path in the inbound and outbound directions to gather various measurement data and compute the performance of one or more selected traffic classes. Network application performance module 98 operates in connection with traffic classification engine 96, which classifies the data flows, as discussed above. In this manner, network application performance module 98 can track network performance on a per-traffic-class basis. In a typical configuration, the traffic classes for which performance is monitored generally correspond to network applications that an enterprise deems important or critical. As discussed more fully below, network application performance module 98, in one implementation, includes both passive and active network application performance monitoring functionality that can be configured to adapt to monitored network application performance.

A.4.a. Monitoring Network or Application Performance

In one implementation, application or network performance is determined relative to response times, which is a primary indicator of a user's experience with a network application. In one implementation, network application performance module 98 is operative to provide performance related statistics like network delay, server delay, and congestion metrics for selected network applications or other user-defined traffic classes, such as individual hosts, subnets, and for any transaction-oriented TCP traffic class. Network application performance module 98 can break down the total observed delay, for each response-time measurement into network delay (time spent in transit) and server delay (time the server used to process the request). The location of traffic management device 130 at strategic points in a given network environment—monitoring all the traffic that passes—facilitates the accurate determination of response times. That is, because traffic management device 130 encounters all data flows transmitted to and from network 40, it can readily calculate the time network traffic spends traveling between a client and a server, the time used by the server, and the time spent on either side of application traffic management device 130 itself.

Network application performance module 98, in one implementation, can make the following measurements or response time determinations:

1) total delay: The total time (in milliseconds) a transaction requires, beginning with a client's request and ending upon receipt of the response, corresponding to the end user's view of the time it takes for a transaction to complete.

2) network delay: The time (in milliseconds) spent in transit when a client and server exchange data. If a transaction requires a large quantity of data to be transferred, it is divided and sent in multiple packets. Network delay includes the transit time for all packets involved in a request-response transaction. The amount of time the server uses for processing a request is not included.

3) server delay: The time (in milliseconds) the server uses to process a client's request after it receives all required data. The server delay is the time after the server receives the last request packet and before it sends the first packet of response (not receipt acknowledgment, but actual response content). This is the time the server takes to process the client's request.

4) normalized network delay: The time (in milliseconds) per kilobyte spent in transit when a client and server exchange data. If a transaction requires a large quantity of data to be transferred, it is divided and sent in multiple packets. Because network delay increases as transaction size increases, it can be misleading when comparing times. Normalized network delay eliminates size as a factor to facilitate comparisons across flows and applications.

5) round trip time (RTT): The time (in milliseconds) spent in transit when a client and server exchange one small packet. Even if a transaction's data is split into multiple packets, RTT, includes only one round trip of a single packet between client and server.

6) Packet exchange time (PET): The time (in milliseconds) between a packet's departure from traffic management device and receipt of the corresponding acknowledgment. This metric reflects only the delay for the network on one side of traffic management device 130. U.S. application Ser. No. 09/710,442 discloses methods and systems for monitoring network delay on an application-level basis attributable to different networks by monitoring data flows at a demarcation point between the two networks. Other network performance attributes can also be monitored, such as jitter.

A.4.a.1. Calculating Transit Delays

Figure 6:
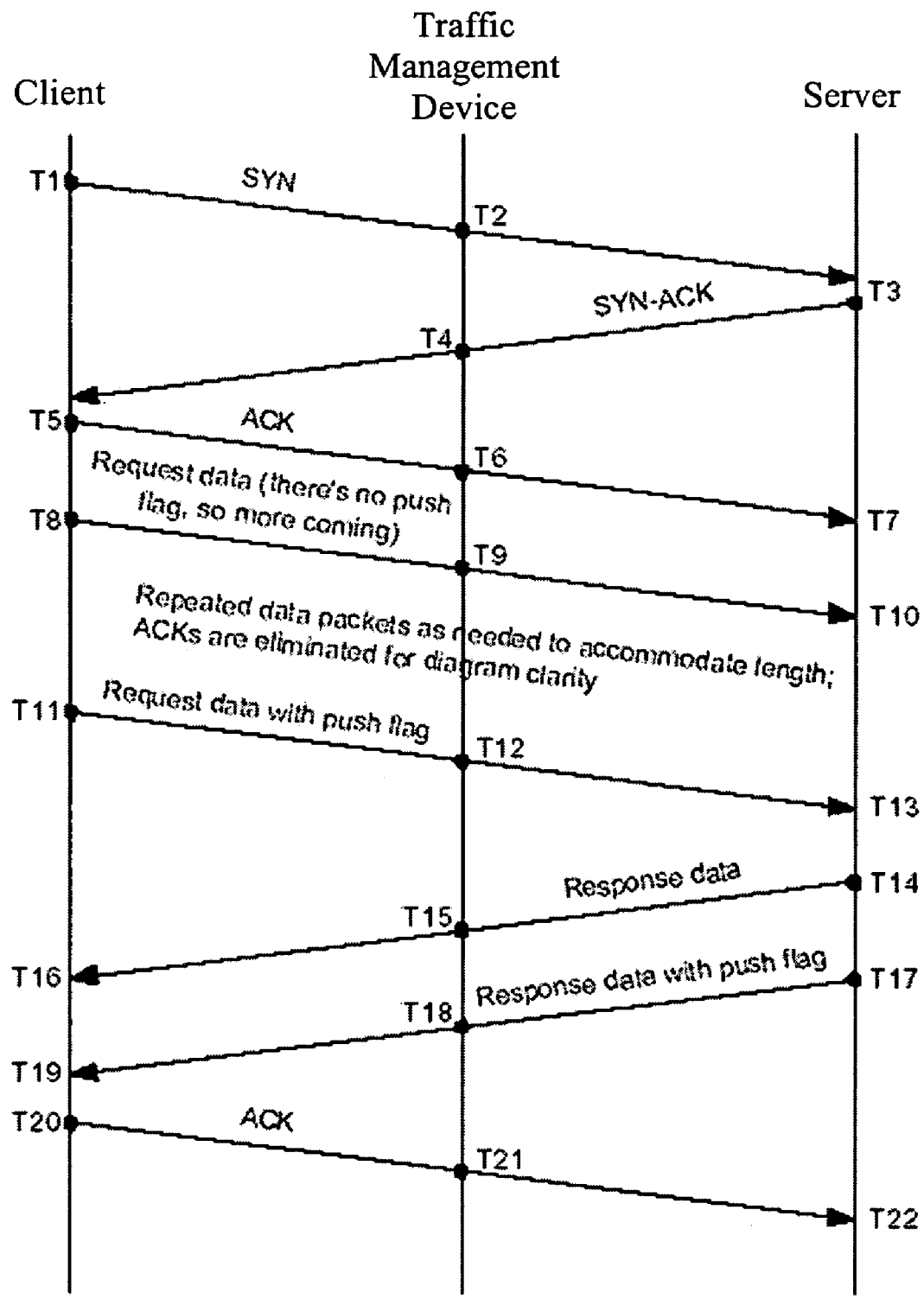
FIG. 6 is a TCP diagram illustrating the measurement of response times associated with TCP transactions.

To compute the delay measurements discussed above, network application performance module 98 tracks the course of a client-server (or peer-to-peer) transaction, making various packet arrival time and size observations, and uses information about a TCP connection (or other network protocol connection) to differentiate one portion of the exchange from another in order to compute accurate performance statistics. FIG. 6 illustrates the typical components associated with a TCP connection. FIG. 6 is a standard TCP diagram showing the course of a network transaction over time. Arrows indicate packets traveling the network between client and server. Time increases as one descends the diagram, with successive event times noted as TN, T1 representing the first event and T22, the last.

As FIG. 6 illustrates, a client initiates a server connection with a SYN at time T1. Network application performance module 98 notes the SYN at time T2 and forwards it along to the server. The server responds with a SYN-ACK at time T3. Network application performance module 98 notes the SYN-ACK at time T4, passing it along as shown. TCP stacks usually respond with a SYN-ACK very rapidly, within the kernel and with no context switches. The SYN-ACK follows the SYN almost immediately. Therefore, time T4 minus time T2 results in an accurate measure of the round-trip network delay between traffic management device 130 and the server. This interchange produces the first quantity, the server transit delay (STD):

$$STD = T4 - T2$$

The client receives the SYN-ACK and issues the final ACK of the three-way handshake at time T5. Network application performance module 98 notes the ACK at time T6, passing it along to the server. In one implementation, it is reasonably assumed that no processing transpires between the client's receipt of the SYN-ACK and its own corresponding ACK at time T5. Time T6 minus time T4 yields an accurate measure of the round-trip network delay between the client and traffic management device 130. The client transit delay (CTD):

$$CTD = T6 - T4$$

Putting together the server transit delay (STD) and the client transit delay (CTD) yields the total delay between the client and the server for a single round trip.

$$RTT(\text{Round-Trip Time}) = STD + CTD$$

A.4.a.2. Determining the Server Delay

The client initiates its request at time T8, arriving at the traffic management device 130 at time T9. For large requests, the request is divided into multiple packets. The TCP diagram of FIG. 6 eliminates the server's corresponding ACKs to simplify the picture, because these ACKs are not material to the calculations described herein. The last request packet, sent at time T11, has its Push Flag set to one indicating it is the final packet. Traffic management device 130 notes the time of this last request packet at T12. After the last request packet arrives at the server at time T13, the server assembles the request, conducts whatever processing is required for the request, and assembles its response. The server sends the first packet (of potentially several response packets) at time 114.

Time T14 minus time T13 is the actual server-processing time required for the request, but these times are not visible to network application performance module 98. However, network application performance module 98 knows that the server's processing time occurred after it saw the last request packet and before it saw the first response packet (time T15 minus time T12). Additionally, it knows that another component of this interval was the transit time from traffic management device 130 to the server and back again. Conveniently, it already has that figure—i.e., the server transit delay (STD). In addition, there is a small amount of time spent serializing the bits in the response packet and preparing them for their bit stream. This time was not included in the original server transit delay because the SYN and ACK packets are extremely small. Network application performance module 98, in one implementation, knows the size of the packet, calculates this preparation time accordingly ($\square$1), and adds it to the STD before subtracting the sum from the time difference. Therefore, $$\text{Server Delay} = (T15 - T12) - (STD + \square 1)$$

A.4.a.3. Determining the Total Delay

The termination of a transaction is key to calculating the total delay; however, it is not always obvious when a transaction ends. The combination of a Push flag from the server and its corresponding ACK from the client frequently signal the end of a transaction. But long transactions often insert Push flags throughout the transaction. In addition to monitoring Push flags, network application performance module 98 uses a timer to track transactions and uses the following rules:

1) If a Push flag seems to indicate a transaction's end, but the server continues sending more data, the timer continues to advance.

2) If the client sends a new request, network application performance module 98 ends the last transaction and records the last time noted.

3) If there is no activity from either the server or the client, network application performance module 98 considers the transaction complete and records the last time noted.

4) When the connection ends, traffic management device 130 sees the FIN and records the last time noted.

Using these techniques, network application performance module 98 notes the last response packet at time T18, makes sure that it saw all required ACKs for the request packets, and verifies that the last response packet indeed represented the end of the transaction. After the client receives the final response packet at time T19, it sends an ACK. The ACK reaches traffic management device 130 at time T21. The client's perspective of response time starts with sending the first request packet (T8) and ends with receipt of the final response packet (T20). Network application performance module 98 sees that interval as time T9 to time T21. Although this is a close estimate of the client's view, it misses some extra preparation time for serializing the first request packet, assuming it is larger than the final ACK. Because network application performance module 98 knows the packet-size difference, however, it can calculate this small discrepancy (□2). Therefore, Total delay=(T21−T9)+□2

A.4.a.4. Determining Network Delay

Once network application performance module 98 computes the server delay and the total delay, it can calculate the amount of time the transaction spent in transit.

Network delay=(Total delay)−(Server delay)

Whereas the RTT represents the transit time for just one round trip, the network delay reflects all transit time for the transaction. If the transaction's data is large, multiple packets need to make their way to and from the server. Only the network delay reflects this overhead. The network delay is not necessarily an even multiple of the RU because multiple packets are not sent consecutively but tend to overlap to varying degrees. In addition, because network and total delay are products of transaction size, ping times and RTM measurements are not comparable.

A.4.a.5. Analysis of Response Time Measurements

Network application performance module 98, in one implementation, collects packet arrival time observations and sizes and computes response time measurements for the data flows and stores the computed measurement values in one process. A separate process accesses the stored values to analyze the performance of one or more network applications in relation to one or more performance thresholds. Depending on the results of the analysis, this process can result in changes to the network performance monitoring policies applied to a given network application or other traffic class. Network application performance module 98, in one implementation, collects response time measurements associated with given traffic class identifiers, maintains the data in volatile memory for a given time interval (e.g., 1 minute), and then stores the data in non-volatile memory (similar to measurement engine 140). In another implementation, measurement engine 140 can be configured to store the relevant measurement variables. In another implementation, network application performance module 98 can average the response time measurements over the time interval and stores the average response time measurements for each traffic class. Network application performance module 98 further includes APIs and associated functionality that aggregates raw response time measurement data over specified time intervals (e.g., the last hour, 15 minutes, day, etc.) on a traffic class or network-wide basis. A separate process, using these APIs, can compute average response times over desired intervals and compare these response times to pre-configured performance thresholds.

Application traffic management device 130, in one embodiment, features a plug-in architecture that facilitates, among other things, updates to network application performance module 98 (as well as other) functionality. A plug-in can contain data that extends and/or modifies one or more tables or data structures used by network application performance module 98 and/or updated code. Network application performance module 98, in one embodiment, uses a shared (dynamic link) library loader to add analysis plug-ins to an existing software release during a boot sequence. The shared library loader, in one embodiment, is operative to determine whether any plug-ins exist (e.g., by checking a directory or other reserved file space), and to extend/modify tables or other data structures and/or register specific code as required. This plug-in architecture can be used to extend or modify how network application performance module 98 analyzes application performance and adjusts the differentiated services policies applied to various traffic classes.

In another embodiment, traffic management device 130 can be configured to include an embedded runtime environment (not shown) that is operative to execute application performance analysis scripts installed on traffic management device 130. Such an embodiment allows network administrators and others to create custom application performance analysis scripts tailored to a vast array of requirements, conditions and goals. In one embodiment, the embedded runtime environment is an object-oriented runtime environment, such as Python or Java®. The embedded runtime environment may be configured to include a runtime interpreter that interprets and executes scripts in source code form. In another embodiment, the embedded runtime environment may be configured to execute compiled application performance analysis scripts. In one such embodiment, the embedded runtime environment may include just-in-time compiler functionality to compile source code scripts into object or byte code form before execution. As discussed more fully below, traffic management device 130 stores one or more application performance analysis scripts operative to determine whether the performance of a given network application or other traffic class complies with one or more threshold criterion. In one embodiment, application performance analysis scripts are implemented as application performance analysis objects, which are instantiations of application performance analysis classes. In one embodiment, application performance analysis objects can be instantiated for each traffic management device 130 and maintained such that the state of the application performance analysis object can be pickled after execution to allow for certain data related to application performance analysis to persist. U.S. application Ser. No. 10/178, 617, incorporated by reference herein, discloses the incorporation of embedded runtime environments into bandwidth management devices and the pickling of objects to persist data and variables.

A.4.b. Synthetic Transactions

As discussed more fully below, in one implementation, traffic management device 130 can be configured to initiate synthetic web or other TCP transactions at periodic intervals to verify the availability of critical hosts and/or to gather additional network path metric information. The network performance statistics set forth above can be computed for both passively-monitored, actual network traffic and the network traffic associated with synthetic transactions. In addition, by targeting intermediate systems in a communications path, network path metrics of discrete network segments, such as a WAN connecting to enterprise networks, can be determined. For example, application traffic management device 130 may be configured to create synthetic transactions targeting router 22a or application traffic management device 130a. The round-trip time measurements between application traffic management devices 130 and 130a can be used to assess SLA compliance for example, and/or obtain information that facilitates isolation of any potential network application performance issues to discrete network segments.

In one implementation, synthetic transactions are similar to scheduled pings or SNMP polls. However, synthetic transactions can be configured to allow for detailed analyses of host behavior, transaction behavior and response times over time. Synthetic transactions can also determine if a service or network application is running, not just if a server is responding. In implementations where application traffic management device 130 is disposed at the network edge, the synthetic transactions are local, consume less bandwidth, and can therefore be more frequent and impose less network burden.

Application traffic management device 130 can be configured to implement synthetic transactions involving a wide variety of network protocols, such as TCP, UDP, HTTP, HTTPS, POP3, SMTP, FTP, ECHO, and the like. In one implementation, using a web-based or command line interface, a synthetic transaction can be configured with the following parameters:

1) <interval>: The repetition interval, if any, for the synthetic transaction;

2) <repeat>: The number of times to issue a request on the established TCP or other transport layer connection (default is 1);

3) <id>: A string that uniquely identifies the synthetic transaction; and

4) <url>: The type of transaction to issue, in the following format <type>://<host>[:<port>][/<path>], where <type> is http, https, pop3, smtp, ftp, echo, or custom; <host> is the DNS name or IP address of the desired host; <port> is the TCP port number to connect to; and <path> is additional information necessary for the request (such as a directory name or a file name, or cgi argument).

In one implementation, the http type will issue a GET request for the file specified by the <path> parameter. The https type does an SSL handshake and issues a GET request for the file specified by the <path> parameter. In one implementation, the smtp and pop3 types also do not send or receive mail; they issue a single command over the channel to elicit a response. The ftp type will issue a single retrieve command (RETR) for the file specified in the <path> parameter. The echo type sends a string to the designated host and the host echoes it back; in one implementation, it uses the echo protocol on port 7. The optional <path> argument has the format <length>[/<fill>] where <length> is the number of bytes to send on each request (the default is 512) and <fill> is a string to fill the request buffer. For example, the command "echo://test.domain.com/10/xyz" sends requests containing xyzxyzxyzx (10 bytes). The custom type allows users to specify a series of requests to be sent alternatively for as many messages as requested by the <repeat> parameter. The request strings are separated by the "|" character. For example, the command "custom://10.7.15.8:25/HELO|MAIL FROM:<bob>|RCPT TO:<brett>|DATA|hey|" sends a simple message to a mail server on port 25 (the default port for SMTP).

To illustrate the foregoing, if a user desires to measure the performance of web transactions to one of an enterprise's Intranet application servers, he or she may determine that a synthetic transaction once every ten minutes is sufficient (providing 144 occurrences each day to measure, average, and assess). For this example, a user would then 1) choose an interval of 10, 2) ignore the repeat and id parameters, 3) choose http, 4) enter the domain name of the web application server, and 5) finish with a forward slash and an html pathname on the application server. The command, in one implementation, may be the following:

synthetic add 10 http://appserver.domainname.com/testfile.htm. In another example, assume that a network administrator desires to know whether a host is operable. The network administrator may choose to send ECHO requests to the desired host at 5-minute intervals by configuring the following command: synthetic add 5 "echo://192.11.22.150".

In one embodiment, to analyze synthetic transactions separately from other network traffic, the synthetic transactions may have their own traffic classes configured in traffic classification engine 96. In one implementation, a user, using administrator interface 150, may enter commands to create one or more synthetic transactions traffic classes distinct from network traffic. In one implementation, a separate synthetic transaction traffic class is created for each host to which requests are transmitted. For example, if a network administrator creates more than one synthetic transaction for a given host, all transactions are classified in a single class. For instance, suppose a user creates an echo transaction to 65.17.12.125 and an http transaction to 65.17.12.125, application traffic management device 130 may create a single class, SyntheticTransactions/65.17.12.125, and classify the echo and http transactions in this class. Of course, other traffic classification schemes can be implemented. Still further, once in the traffic class configuration hierarchy, a network administrator may also choose a bandwidth management policy for the network traffic associated with the synthetic transactions. Still further, synthetic transactions can be directed to end hosts, such as application servers, as well as intermediate systems, such as routers (e.g., router 22a in FIG. 3), gateways, and other application traffic management devices (such as application traffic management device 130a, in FIG. 3).

A.4.c. Configuration of Passive-Active Application Performance Monitoring

Based on the foregoing, a network administrator may configure a network application performance monitoring scheme that conditionally injects synthetic transactions into the network based on one or more network path metrics obtained by the passive monitoring schemes discussed above. In another implementation, the present invention can be configured to increase the frequency at which synthetic transactions are injected. In one implementation, the functionality described herein can be applied on a per-traffic class basis. For example, to configure application traffic management device 130, a network administrator may select a traffic class, specify a network performance metric to be monitored (e.g., latency, jitter, packet exchange time, etc.), one or more appropriate metric threshold values, and specify a synthetic transaction to be implemented (see above) when the metric threshold value (s) have been crossed.

As discussed above, synthetic transactions can be directed to an end host or an intermediate system in the network. In one implementation, one or more of the synthetic transaction attributes (e.g., interval, repeat, type, host, port, path, etc.) may be specified as conditional parameters that are dynamically generated. For example, in some implementations, the target host or node may be statically defined. In other implementations, however, the <host> attribute may be defined as the "outside" server IP address corresponding to an actual data flow that traversed application traffic management device 130. For example, application traffic management device 130 may use the flow data record technologies disclosed in U.S. application Ser. No. 10/676,383 to record data characterizing data flows on a traffic class basis and to identify an "outside" server for the synthetic transaction. For example, network application performance module 98 can access the flow data records corresponding to a select traffic class and identify a target node by, for example, selecting the most active node that also meets other criteria for the target node (e.g., outside server). In another implementation, the target host may be an intermediate node in the communications path such as router 22a or application traffic management device 130a (see FIG. 3). In one implementation, application traffic management device 130 may dynamically discover application traffic management device 130 using, for example, the dynamic probing technologies disclosed in U.S. application Ser. No. 10/015,826. In one implementation, if the network performance corresponding to a given network application or other traffic class cross a threshold, application performance module 98 scans the flow data records collected over the most recent time interval for the data flows matching the given network application to identify the IP address of the target host.

A.4.d. Exemplary Process Flows

Figure 4:
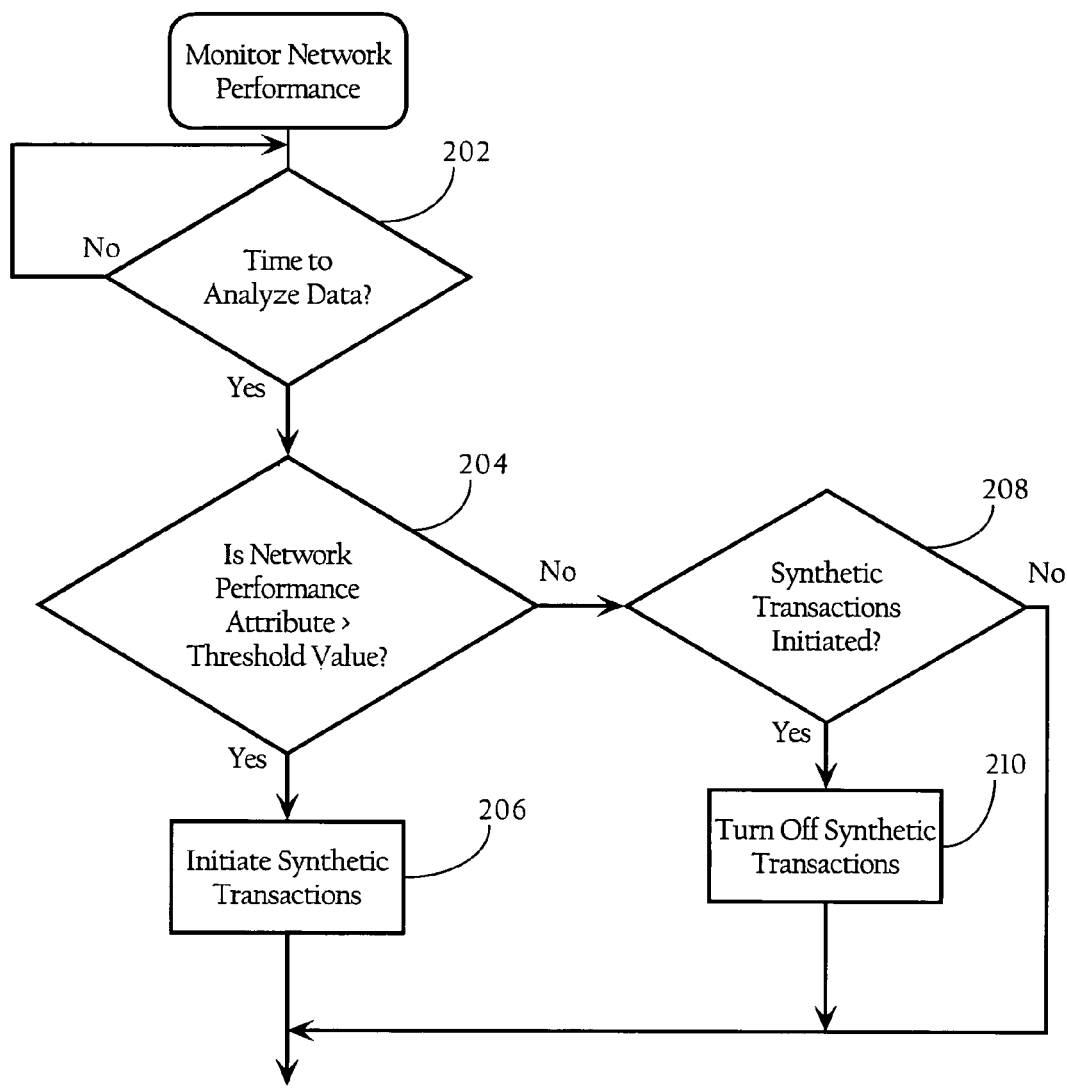
FIG. 4 is a flow chart diagram illustrating a process flow, according to one implementation of the present invention, directed to selectively injecting synthetic transactions into a network based on passively monitored network application performance.

FIG. 4 illustrates a process flow, according to one implementation of the present invention, directed to conditionally initiating synthetic transactions based on passively monitoring a network performance attribute. In one implementation, network application performance module 98 applies this process flow on a per-traffic class basis. In one implementation, network application performance module 98 passively monitors the performance of selected network applications based on monitoring the arrival of packets in data flows relative to the properties of the corresponding network protocol employed by the data flow (e.g., TCP), as discussed above. As FIG. 4 illustrates, application performance monitoring module 98, in one implementation, analyzes the network performance data collected for a given network application on a periodic basis (202) to determine whether a configured network performance attribute (e.g., latency, packet exchange time, etc.) over a configured interval has exceeded a threshold value (204). If so, application performance module 98 accesses a database of stored synthetic transaction parameters corresponding to the network application and initiates the synthetic transaction(s) according to the configured parameters (206). As FIG. 4 provides, if the network performance attribute(s) for the network application subsequently falls below the threshold value, application performance module 98 turns off the synthetic transactions for the network application (208, 210).

Figure 5:
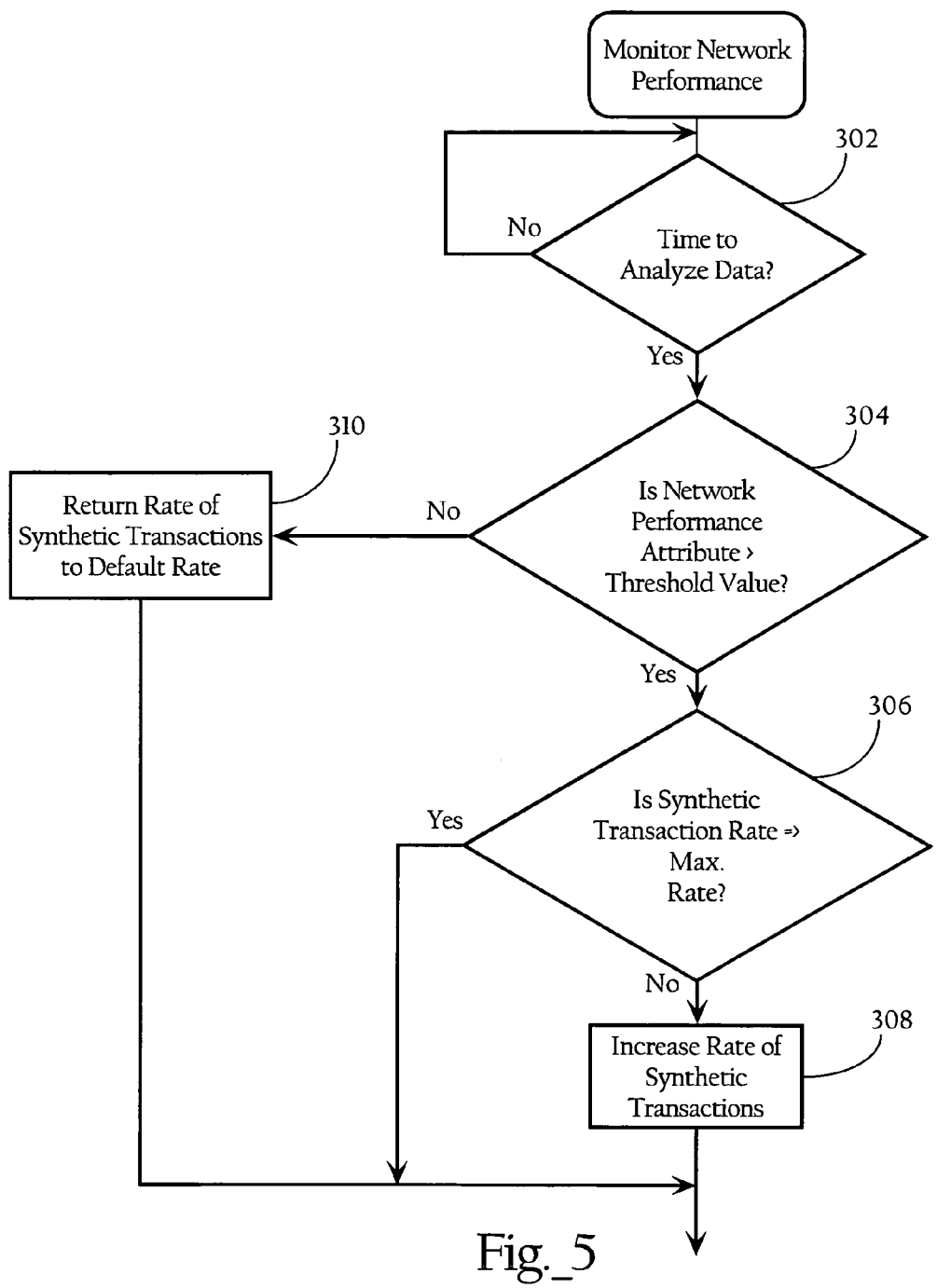
FIG. 5 is a flow chart diagram providing a process flow, according to another implementation of the present invention, directed to modulating the rate of synthetic transactions based on monitored network application performance.

FIG. 5 illustrates a process flow, according to another implementation of the present invention, where network application performance module 98 modulates the rate of synthetic transactions based on a monitored network performance attribute. As FIG. 5 illustrates, network application performance module 98, in one implementation, periodically looks at one or more monitored network performance attributes corresponding to a network application (see 302), and adjusts the rate of synthetic transactions based on monitored performance attribute. For example, if the monitored network performance attribute exceeds a threshold value (304), application performance module increases the rate of the synthetic transactions for the network application up to a maximum rate (306, 308). In the implementation shown, the rate of synthetic transactions is incremented at fixed amounts up to a maximum rate. As FIG. 5 illustrates, if the monitored network performance attribute subsequently falls below the threshold (304), network application performance module 98 returns the synthetic transaction rate to the default rate (310). Of course, other implementations are possible, such as gradually decreasing the rate of synthetic transactions by a fixed amount at each analysis interval.

The process flows illustrated in FIGS. 4 and 5 can be used in many different configurations for monitoring a variety of network applications. For example, a user may select a target network application (e.g., SAP over HTTP, Citrix®, etc.), or a target end point (e.g., an application server 43 in FIG. 3) or group of application servers), specify a threshold latency value (e.g., total delay, network delay, packet exchange time, etc.), and configure a synthetic transaction command if the threshold value(s) is crossed. A user, for example, may configure a synthetic transaction to periodically transmit an ECHO request to the ingress interface of router 22a (see FIG. 3) on the other side of the private virtual circuit or WAN path between networks 40 and 40a to allow network application performance module 98 to assess the performance of network 50. Furthermore, the threshold values may be configured relative to a service level agreement, or network application QoS requirements. In another implementation, network application performance module 98 can be configured to increase the frequency of synthetic transactions from a default rate of one transaction per minute to 2 transactions per minute, if monitored network latency crosses a configured threshold.

Figure 7:
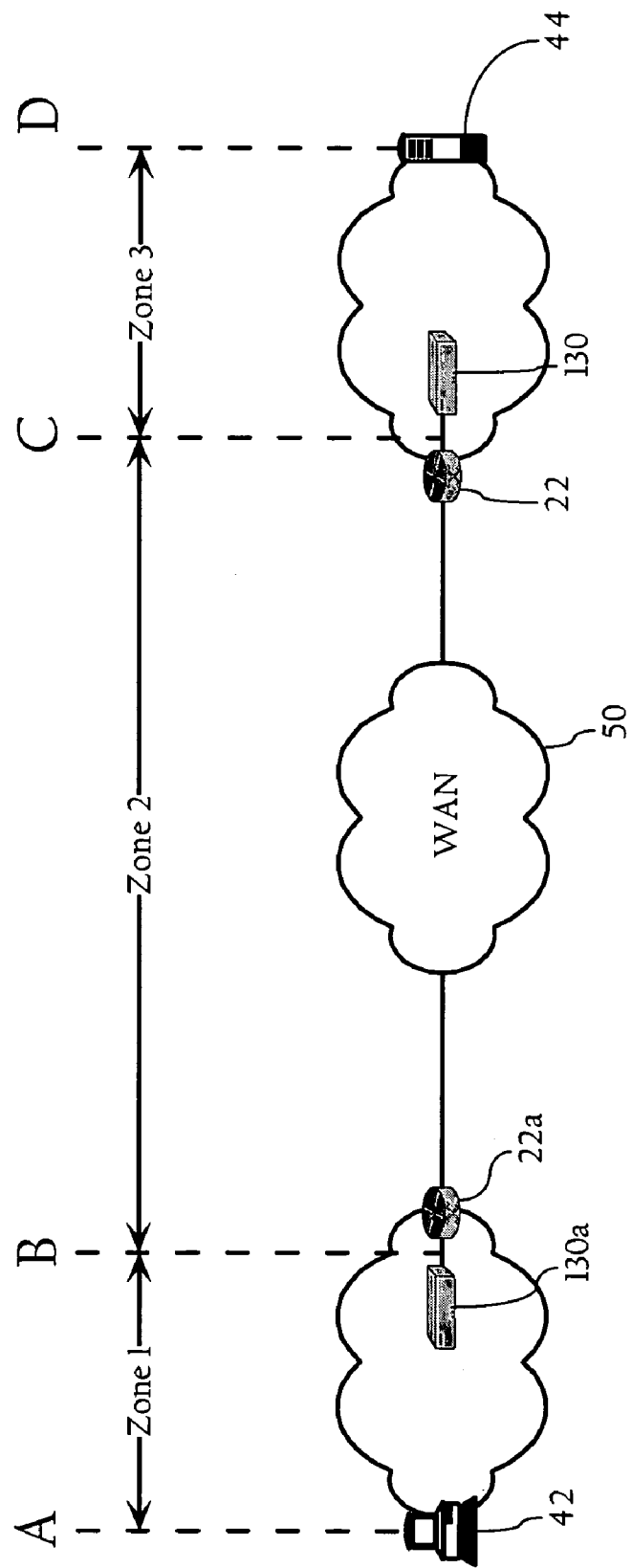
FIG. 7 is a functional block diagram illustrating how implementations of the present invention may isolate a network zone or segment for analysis of performance issues.

As one skilled in the art will recognize, the present invention allows a network performance monitoring scheme that triggers active probing of a WAN, for example, to isolate its performance, when end-to-end network application performance falls below a threshold value. FIG. 7 is a functional block diagram that illustrates an implementation. For example, application traffic management device 130a can be configured to passively monitor the end-to-end latency (e.g., round trip times, network delay, etc.) of a network application conducted between client 42 and server 44 (in other words, between points A and D in FIG. 7). As discussed above, a synthetic transaction can be configured such that application traffic management device 130a, at point B, transmits a request (or other message) to application traffic management device 130 (or an ingress interface of router 22) at point C in FIG. 7. For example, application traffic management device 130a can be configured to transmit an ECHO request to application traffic management device 130, if the end-to-end performance of a selected network application crosses a threshold value. Application traffic management device 130a can therefore isolate the performance of network 50 by analyzing the time between transmission of the ECHO request and any response from the target device. The network path metrics obtained from monitoring the synthetic transactions can be compared against a service-level agreement (SLA) for network 50 to assess compliance. In one implementation, application traffic management device 130 can be configured to compare the computed network path metrics against an SLA and transmit an SNMP trap or other notification when the performance of network 50 falls outside of compliance with the SLA. Of course, implementations of the present invention can be configured to achieve a variety of network application performance monitoring schemes.

Lastly, although the present invention has been described as operating in connection with end systems and networks employing the TCP, IP and Ethernet protocols, the present invention has application in computer network environments employing any suitable transport layer, network layer and link layer protocols. Moreover, other system architectures are possible. For example, the configuration of traffic classification engine discussed above represents one of a myriad possible implementations and configurations. Still further, the adaptive network monitoring functionality discussed above can be implemented as scripts executed within an embedded runtime environment. U.S. application Ser. No. 10/178,617 and 10/812,198 discloses the use of embedded runtime environments and scripts in application traffic management devices. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. A method for monitoring the performance of a network, comprising:
    passively monitoring, at a network device disposed at the edge of a first network, the performance of a network application, wherein the passively monitored performance of the network application is the end-to-end performance of the network application between a first set of hosts connected to the first network and a second set of hosts connected to a second network, wherein the performance of the network application is passively monitored by recording, at the network device, packet arrival times for data flows associated with the network application between the first set of hosts and the second set of hosts, wherein the end-to-end performance of the network application is based on the time data packets spend in transit between the first set of hosts and the second set of hosts during respective transactions, and wherein the time is normalized based on the size of the packets in a given transaction;
    repeatedly initiating, at the network device, synthetic transactions at a first predetermined transaction frequency with an intermediate system disposed proximal to the edge of the second network, wherein a third network interconnects the first and second networks, and wherein each synthetic transaction is initially configured with any combination of one or more of: an interval parameter specifying a repetition interval for the synthetic transaction, a repeat parameter specifying a number of times to issue a request on a connection, an id parameter that uniquely identifying the synthetic transaction, or a url parameter that specifies the type of synthetic transaction to issue; and
    in response to the end-to-end performance in the monitoring step crossing over a threshold performance value,
        increasing the transaction frequency of the synthetic transactions from the first transaction frequency to a second increased transaction frequency based on one or more observations of the end-to-end performance of the network application;
        monitoring the performance of the third network relative to the synthetic transactions transaction at the second increased transaction frequency; and
        in response to the end-to-end performance in the monitoring step crossing below the threshold performance value, decreasing the transaction frequency of the synthetic transactions back to the first predetermined transaction frequency.

2. The method of claim 1 wherein at least one synthetic transaction comprises a request transmitted by the first network device, and a response transmitted by the intermediate network device.

3. The method of claim 2 wherein the request comprises an ECHO request.

4. A method, comprising:
    at a network device disposed proximal to an edge of a first network,
        repeatedly recording packet arrival times for data flows between a first set of hosts connected to the first network and a second set of hosts connected to a second network that are associated with a network application to monitor the end-to-end performance of the network application, wherein the end-to-end performance of the network application is based on the time data packets spend in transit between the first set of hosts and the second set of hosts during respective transactions, and wherein the time is normalized based on the size of the packets in a given transaction;
        repeatedly initiating synthetic transactions to the second network at a frequency, wherein the frequency is a default frequency, and wherein each synthetic transaction is initially configured with any combination of one or more of: an interval parameter specifying a repetition interval for the synthetic transaction, a repeat parameter specifying a number of times to issue a request on a connection, an id parameter that uniquely identifying the synthetic transaction, or a url parameter that specifies the type of synthetic transaction to issue;
        computing a first network path metric for the network application based on recently recorded packet arrival times;
        if the first network path metric is greater than a threshold value, then
            increasing the frequency of the synthetic transactions based on observations of the network path metric;
            repeatedly initiating the synthetic transactions to the second network at the increased frequency;
            computing a second network path metric for the network application based on recently recorded packet arrival times; and
            if the second network path metric is less than or equal to the threshold value, then decreasing the frequency of the synthetic transactions to the default frequency.

5. A system facilitating the monitoring of network application performance, comprising:
    a network monitoring device disposed at the edge of a first network, wherein the first network includes at least a first host connected thereto;
    an intermediate network device disposed at the edge of a second network, wherein the second network includes at least a second host connected thereto;
    a third network interconnecting the first and second networks;
    wherein the network monitoring device is operative to:
        passively monitor the end-to-end performance of a network application involving the transmission of data flows between the first and second hosts by recording, at the network monitoring device, packet arrival times for data flows associated with the network application between a first set of hosts connected to the first network and a second set of hosts connected to a second network, wherein the end-to-end performance of the network application is based on the time data packets spend in transit between the first set of hosts and the second set of hosts during respective transactions, and wherein the time is normalized based on the size of the packets in a given transaction;

repeatedly initiate synthetic transactions at a first predetermined transaction frequency with the intermediate device, and wherein each synthetic transaction is initially configured with any combination of one or more of: an interval parameter specifying a repetition interval for the synthetic transaction, a repeat parameter specifying a number of times to issue a request on a connection, an id parameter that uniquely identifying the synthetic transaction, or a url parameter that specifies the type of synthetic transaction to issue; and if the end-to-end performance associated with the network application crosses over a threshold value, increase the transaction frequency of the synthetic transactions with the intermediate network device from the first predetermined transaction frequency to a second increased transaction frequency based on one or more observations of the end-to-end performance of the network application;

monitor the performance of the third network relative to the synthetic transactions at the second increased transaction frequency; and decrease, if the end-to-end performance associated with the network application crosses below the threshold value, the transaction frequency of the synthetic transactions back to the first predetermined transaction frequency.

6. The system of claim 5 wherein the intermediate network device is a network monitoring device.

7. The system of claim 5 wherein the intermediate network device is a router.

8. The system of claim 5 wherein at least one synthetic transaction comprises a request transmitted by the network monitoring device, and a response transmitted by the intermediate network device.

9. The system of claim 8 wherein the request comprises an ECHO request.

10. The system of claim 5 wherein the end-to-end performance of the network application is based on the total time between requests transmitted by the first host and corresponding responses received from the second host by the first host.

11. The system of claim 5 wherein the end-to-end performance of the network application is based on the time required for the first and second host to exchange a data packet.

* * * * *